(12) United States Patent
O'Callaghan et al.

(10) Patent No.: US 6,337,862 B1
(45) Date of Patent: Jan. 8, 2002

(54) NETWORK SWITCH WITH TRUNCATED TRIE LOOK-UP FACILITY

(75) Inventors: Sorcha O'Callaghan, Lucan; Edele O'Malley, Dublin; Kevin Loughran, Castleblayney; Christopher Gilbert, Dublin, all of (IE)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/573,821

(22) Filed: May 18, 2000

(30) Foreign Application Priority Data

Feb. 26, 2000 (GB) .............................................. 0004517

(51) Int. Cl.[7] .............................................. H04L 12/28
(52) U.S. Cl. ...................................... 370/392; 370/401
(58) Field of Search ................................ 370/254, 389, 370/392, 395, 401, 466, 467, 475, 492, 400, 402, 403; 705/77; 709/100, 104, 105, 201, 219, 220, 221, 223, 224, 226, 227, 229; 713/201; 707/2, 7, 3

(56) References Cited

U.S. PATENT DOCUMENTS 5,774,660 A * 6/1998 Brendel et al. ............. 709/201
5,918,017 A * 6/1999 Attanasio et al. ........... 709/224
6,061,349 A * 5/2000 Coile et al. .................. 370/389
6,101,616 A * 8/2000 Joubert et al. ................ 714/11

FOREIGN PATENT DOCUMENTS

| EP | 0 551 243 A2 | 7/1993 |
| EP | 0 594 196 A1 | 4/1994 |
| GB | 2 346 519 A | 8/2000 |
| WO | 96/00945 | 1/1996 |

* cited by examiner

*Primary Examiner*—Chau Nguyen
*Assistant Examiner*—Inder Pal Mehra
(74) *Attorney, Agent, or Firm*—Nixon & Vanderhye P.C.

(57) ABSTRACT

A network switch including a multiplicity of ports for the reception and forwarding of addressed data packets including network destination data and network source address data, and a forwarding database having a trie search facility organised in blocks of pointers, which are accessed by respective segments of a search key and identify in a last stage of a search forwarding data identifying each port from which a packet should be forwarded and in any stage of the search prior to the last stage a block of pointers, the switch including a device operable before the trie search facility is utilised for a given packet to compare a network destination address of the given packet with at least one stored address and when the network destination address matches the stored address to access the network source address data of the given packet for use as the search key.

6 Claims, 5 Drawing Sheets

NETWORK SWITCH WITH TRUNCATED TRIE LOOK-UP FACILITY

FIELD OF THE INVENTION

This invention relates generally to packet-based communication networks wherein data is conveyed between stations, such as users and switching devices, by means of data packets including, in general, address data as well as control and/or message data. The invention more particularly relates to network switches which have a multiplicity of ports by which addressed data packets can be received and a multiplicity of ports (which may be constituted by the aforementioned multiplicity of ports) for the forwarding of data packets to their respective destinations.

BACKGROUND TO THE INVENTION

Network switches fall into two general categories. One category, frequently called bridges, responds to 'layer 2' or media access control addresses in data packets. These addresses identify, in the case of a unicast transmission, the local source and destination devices of the relevant packet. Another category of switch responds to 'layer 3' or protocol addresses, often termed 'IP' addresses. Such addresses indicate the network of a source or destination of the packet and usually the network address within that network of the source or destination device. Such network addresses may be accompanied by VLAN data, identifying a virtual network within a physical network. Switching devices responsive to network addresses are often termed routers and if so are normally software controlled devices which are capable of performing a variety of monitoring and control functions not primarily relevant to the present invention. However, layer 3 switches, that is to say switches which can respond to network addresses to determine forwarding data can be realised in hardware form. Moreover, switches which can respond either to media access control addresses or network addresses to provide forwarding data are known; one example is given in published British patent application GB-2337674-A.

A customary function which a switch of the general kinds described above has to perform is a look-up which relies on some or all of the relevant address data in the packet to obtain the aforementioned 'forwarding data'. This forwarding data is obtained from a data table which relates the relevant address data with specific data such as a local MAC address and/or a port mask which can be used by the switching engine (whether in hardware or software form) to determine which port or ports are to be employed for forwarding the relevant packet. In the case of a unicast transmission a packet will be forwarded only from one port, for a multicast transmission, which is normally distinguished from a unicast transmission by virtue of special information in a header, a port mask may identify more than one port for the forwarding of a packet. The specific nature of the forwarding data or its format is not primarily relevant to the present invention provided that the look-up made in response to the data available in the packet enables a determination of the correct port or ports from which the packets should be forwarded.

There exists a variety of schemes for organising the look-up which has to be performed in the 'forwarding database' of the switch and certain techniques have been developed in order to make the look-up more efficient. A motive for these techniques is the substantial storage space required for a forwarding database. Typically, for Ethernet packets, media access control addresses (both source and destination) comprise 48-bits each. Network address each comprise 32 bits each and a VLAN identification normally comprises 5 bits. In some circumstances, for example those particularly mentioned hereinafter, a look-up may require a full 69-bit key if both the source address and the VLAN identification are included with the destination network address in the look-up.

One scheme for rendering the look-up more efficient is known as a 'trie' search wherein successive portions of the key are employed in each of a multiplicity of stages, each locating a pointer to another block in the search until the search terminates in a data entry which includes the relevant forwarding data. A trie search is particularly efficient for network addresses wherein a large number of the possible destinations have part of the address in common (such as would occur if all the relevant devices were on the same network). One example of a trie search is described in our co-pending GB patent application number 9925517.6 filed Oct. 29, 1999.

SUMMARY OF THE INVENTION

The present invention is particularly concerned with improving the speed of look-ups required for network address controlled multicasts and other examples, for example routing in server load balancing. More particularly, an address look-up may be performed employing a key made up of the layer 3 address information, i.e. the network destination address, the network source address and the VLAN identification of the source. This key is employed to search a tree data structure until a 'leaf' (particularly an associated data block) is found. Each level in the tree employs a few more bits from the key. This means that many addresses with a common prefix can refer to the same target address.

Server load balancing is a method of sharing a load between a plurality of servers for higher performance and also to obtain the protection of redundancy, so that operations may be duplicated in servers to enable operation of a network to continue notwithstanding the failure of one of the servers. All the servers in a group may have for this purpose the same virtual network address. The switch or router which controls these servers can share the traffic destined for the virtual address based on some algorithm. One of these algorithms may employ the particular network source address of a packet to determine which server will be the destination for that packet.

Currently for multicasting and server load balancing the entire network address information would have to be stored in a trie look-up table. This requires a search of the entire key, normally 69 bits. In server load balancing, the destination network address of all traffic going towards the group of servers will always be the virtual address of the servers and only the network source address and the VLAN identification data will vary.

The present invention is based on the truncating of the search so that a determination of whether the network destination address corresponds to the virtual address enables the trie search to be performed on only the remainder of the network address information, particularly the network source address and the VLAN identification (if this is used). Generally therefore a multiplicity of stages in a trie look-up scheme may be saved.

Similarly, for multicasting based on network addresses, the network destination address may be compared with a set of registers containing known network destination addresses. If there is a match at this stage the trie search key may commence with the first section of the network source address.

Further features of the invention will be apparent from the following drawings and detailed description.

DETAILED DESCRIPTION

Figure 1:
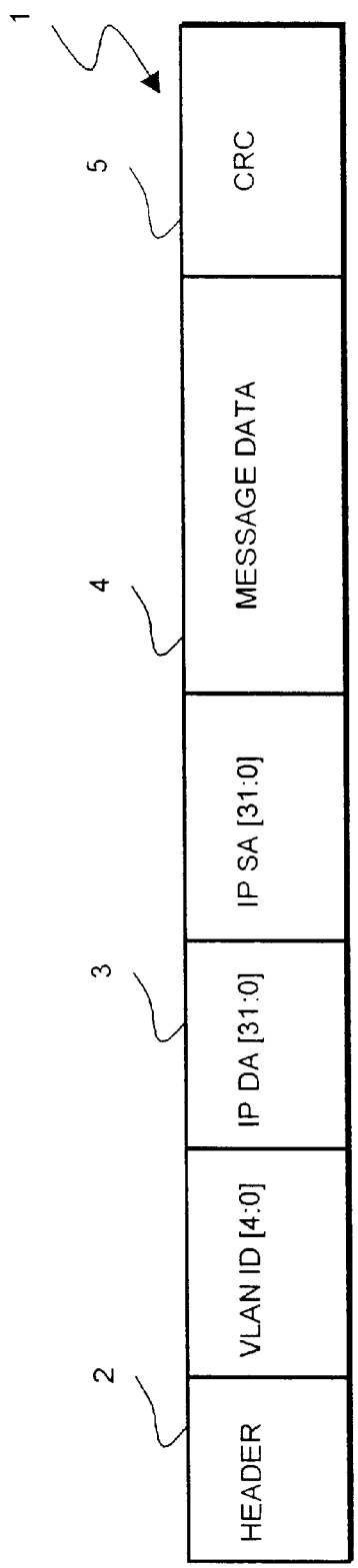
FIG. 1 is a schematic diagram of an addressed data packet of the kind which may be employed in one example of the present invention.

FIG. 1 illustrates a typical addressed packet of the kind which may be employed in the switch according to the invention and which contains the address data which is used to provide a key for the modified trie search which is the subject of the invention. The packet 1 which is illustrated in FIG. 1 contains a header portion 2, protocol or network address data 3, message data 4 and cyclic redundancy code data 5. Typically the header includes at relevant times media access control addresses. These will not be described because the switch which is the subject of this particular example is intended to operate on network address data. In the present example this includes a network destination address (IP DA) which is typically a 32-bit address, a network source address (IP SA), which is likewise a 32-bit address, and a source VLAN identification, typically a 5-bit field shown separately but in practice embedded in the header. The message data need not be present in the case of a control frame or packet. The cyclic redundancy code data is not relevant to the present invention but is normally generated by dividing the packet data by some appropriate polynomial using Galois field arithmetic, the cyclic redundancy code data being constituted by the 'remainder' of the division.

A look-up in a forwarding database employing the layer 3 information may employ all or part of the network address data 3 in packet 1. For certain purposes it is sufficient to employ the destination address (IP DA). However, for other purposes, particularly multicasting based on network addresses or server load balancing, the entire network address data, that is to say at least the IP DA and the IP SA as well as the source VLAN identification (VLAN ID) may need to be employed.

Figure 2:
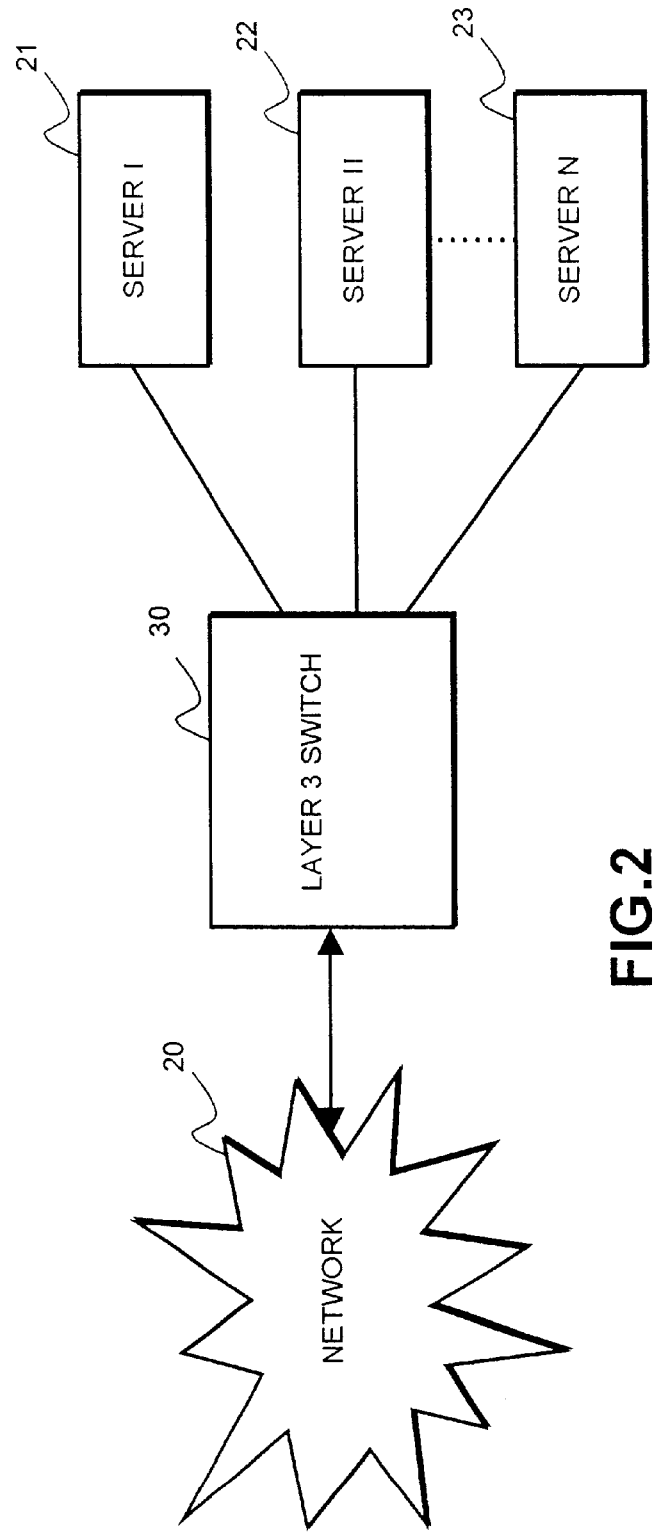
FIG. 2 illustrates in simplified form part of a network including a group of servers of which the loads may require to be balanced.

FIG. 2 illustrates in simplified form part of a network in which the invention may be employed. The network consists of a sub-network 20, a switch 30 (which will be described hereinafter) and a group or farm of servers 21, 22 and 23. There is not necessarily any restriction on the number of servers, which are denoted server I, server II and server N to indicate the substantially unrestricted plurality that may be employed.

In a system such as is shown in FIG. 2, the servers may each share a virtual IP address. In order therefore to obtain the destination for a packet which traverses the switch and should be forwarded to one or other of the servers, it is necessary not only to perform a look-up which includes the destination address but also the source address in order to operate an algorithm which divides the load amongst the servers dependent on the network source address of the packets.

However, there are other circumstances wherein an entire key may be required. Particularly for IP multicasting both the network destination address (IP DA) and the network source address (IP SA) need to be included in the search. In a complex network of routers the traffic from the source of the multicast data stream may come into a particular router from a number of different adjoining routers. Depending on which one it came from it will go out on a different group of ports and for this purpose the source and destination network addresses (IP SA and IP DA) are needed. This is part of all multicast routing protocols, e.g. the DVMRP algorithm, in which routers are constantly monitoring to see who has registered for the multicast stream. The routers communicate with each other to create a tree structure. The router which is closer to the source of a multicast message is elected to be in charge of forwarding multicast messages. All other routers will simply discard the multicast messages sent from that source.

Figure 3:
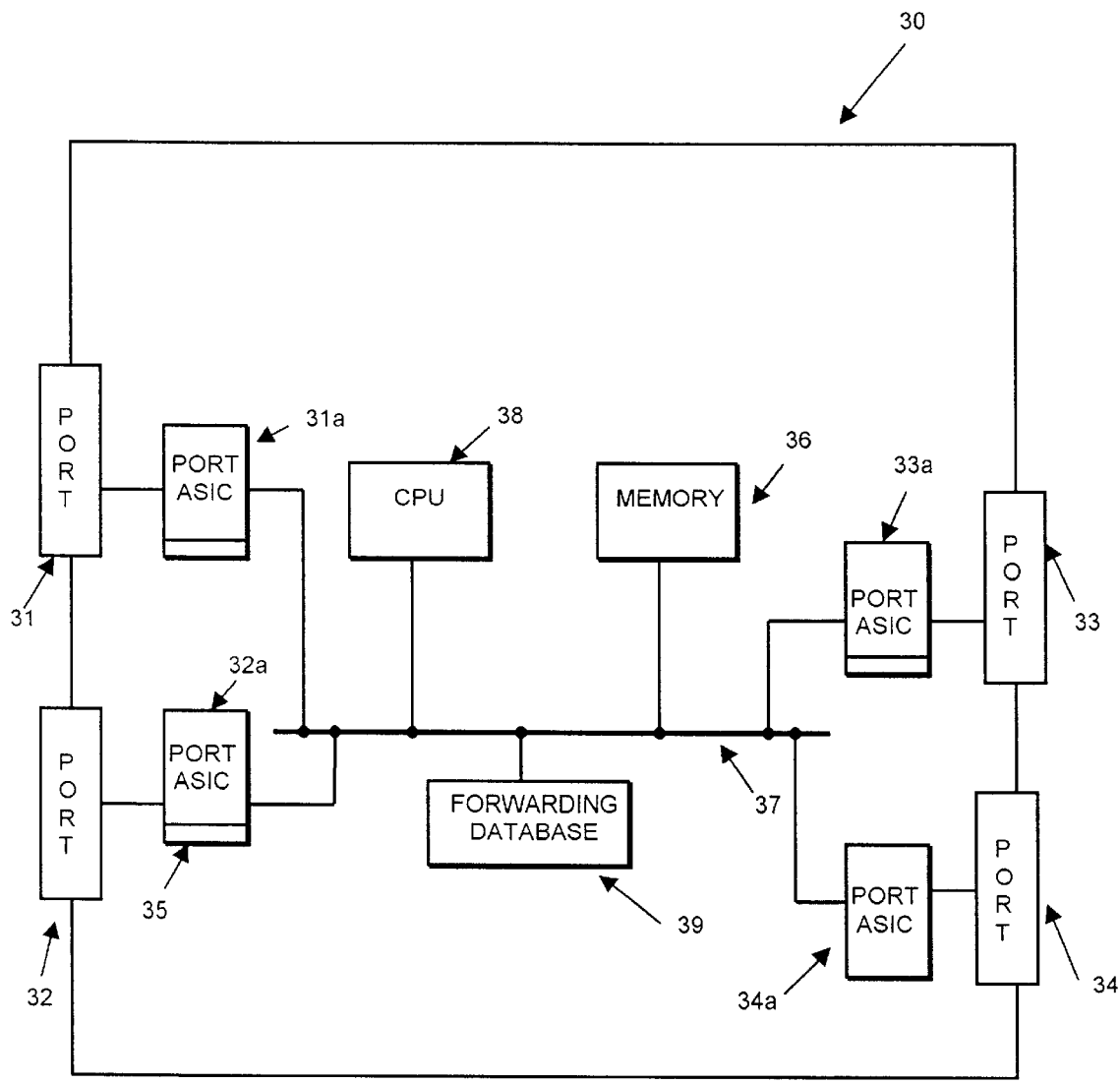
FIG. 3 illustrates one possible architecture for a network switch.

FIG. 3 shows one example of a switch architecture in which the present invention may be performed. This is but one of a wide variety of different switch architectures and the invention is not intended to be limited to any particular one of them.

In this example, a switch 30 has a multiplicity of ports, which may typically in practice be twenty-eight or more ports, but which are represented in this example by four ports 31, 32, 33 and 34. Each of the ports has a port ASIC, 31a to 34a respectively. Typically these ASICs contain the physical layer devices (PHYs) and media access control devices (MACs) relevant to the port and may include buffer memory shown for example at 35 for port ASIC 32b.

The switch is shown as including a memory 36 for the temporary storage of packets after they have been received by the various ports and before they are forwarded from their intended destination ports, a bus system 37 by means of which packet data, control data and status data is conveyed to and from the various parts of the switch, a processor (CPU) 38 and a forwarding database 39. The CPU may operate from software partly stored in memory 36.

The various elements of the switch have been shown separately for the sake of convenience. However, the port ASICs, and part of a forwarding database and the memory 36 may be provided on a single chip, some of the memory and forwarding database being provided 'off chip'.

The relevant operation of a switch 30 as far as the present invention is concerned is that the address data of a packet is employed in a look-up of the forwarding database so as to provide forwarding data, such as an identification of ports, from which the packet is to be dispatched. The particular nature of the forwarding data and also the manner in which it is handled depends on the architecture.

Figure 4:
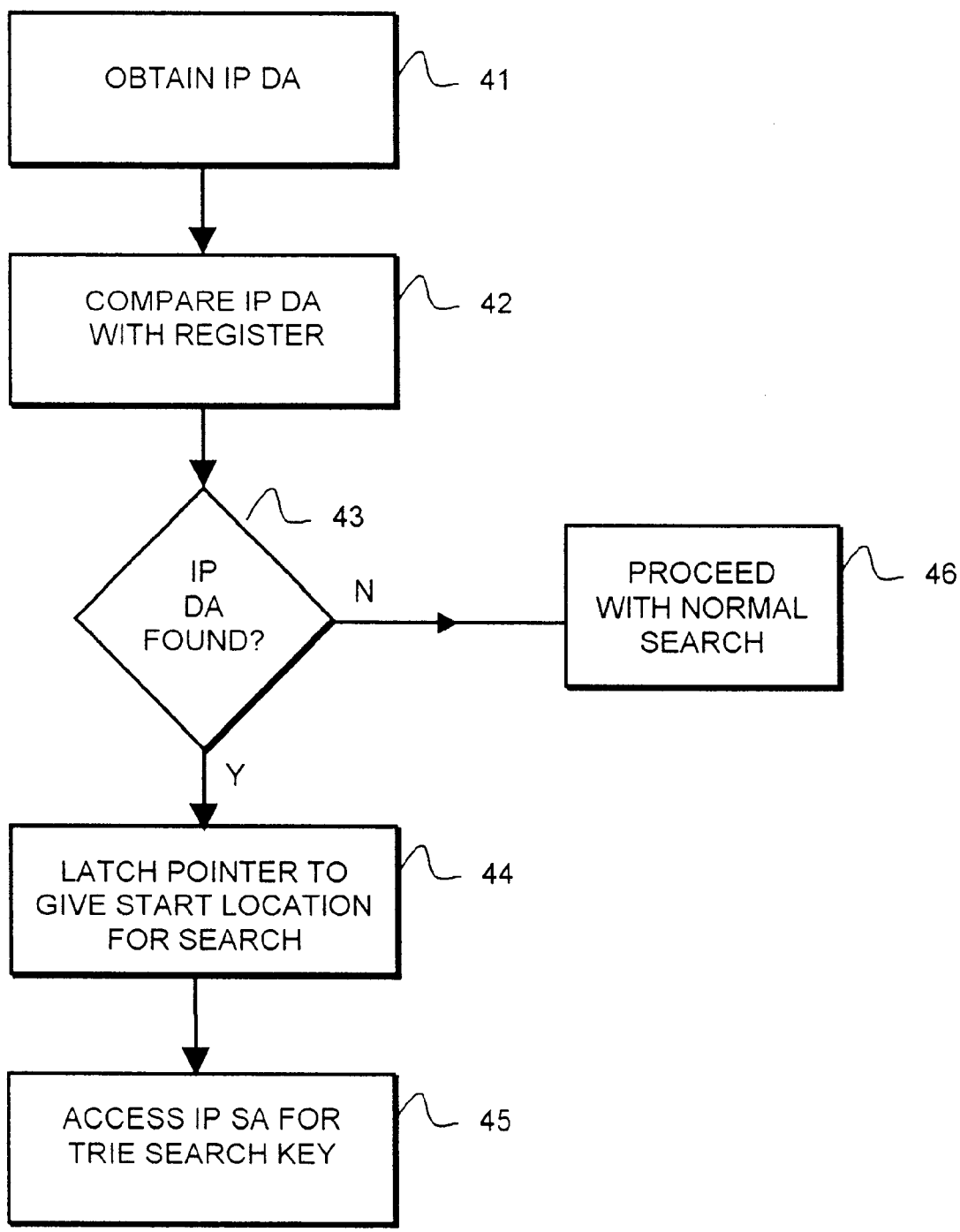
FIG. 4 is a flow diagram illustrating a preliminary stage prior to a trie search in accordance with the invention.

FIG. 4 illustrates a preliminary stage to a trie search according to the invention. When a packet comes into a port and before it reaches the forwarding database the IP DA portion of the packet header is latched (stage 41) and compared (stage 42) to the values stored in a bank of registers which are programmed by software. Firstly the IP DA is compared with a bank of registers which contain any Virtual IP addresses of server farms. Then if it does not match any of these it will be compared against a bank of registers which contain the IP DAs of any IP Multicast traffic currently being forwarded by the router. These registers will be maintained by software and are conveniently defined within memory 36.

If the destination address is found (stage 43) in one of these registers, as is the case where the register contains the virtual address of the servers 21 to 23, then the search engine accesses (stage 44) a pointer. It latches this pointer and uses it to give the start location of the search, i.e. start of the trie location which when indexed by the IP SA will give the required result. From here the IP SA is used (stage 45) as the key to search as usual. If however the particular network destination address is not held in the register, then a normal trie search (stage 46) may be performed.

Figure 5:
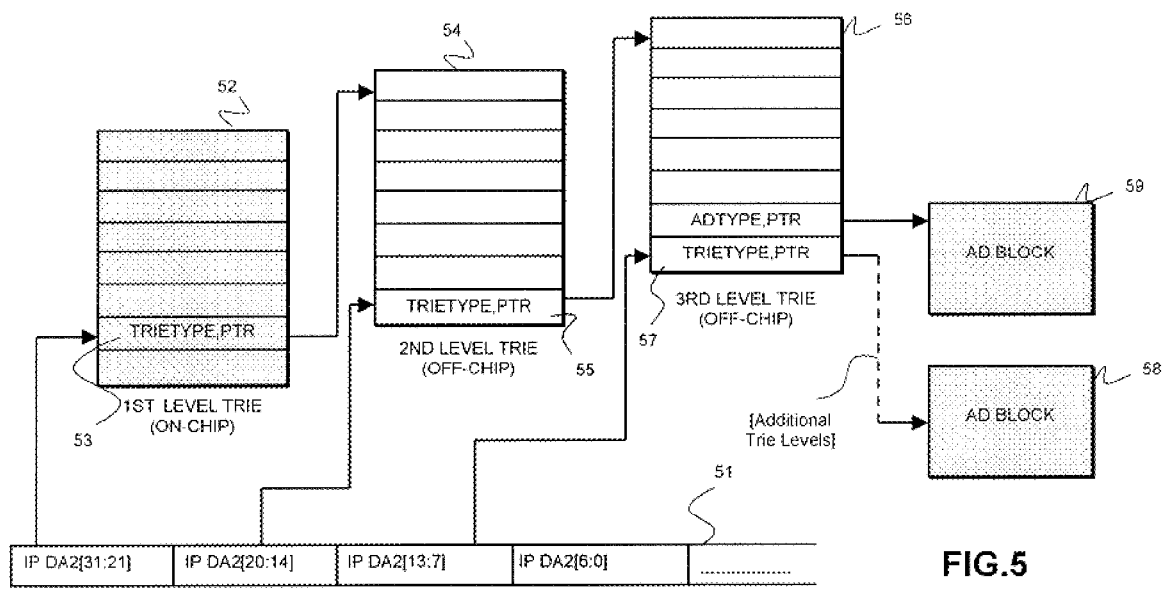
FIG. 5 illustrates trie searches performed in accordance with the invention.

FIG. 5 illustrates a normal trie search in which successive blocks are accessed using a key including the destination address (IP DA).

In this example, a key including a destination address is shown at 51.

In a trie search, at each stage there is defined a pointer which may be one of two types. A first type is a 'result' wherein the pointer points to an address data block containing the required forwarding data. It may happen that such a block is reached after only one stage in a key. This occurs when only the first portion of a network address is sufficient to determine the next hop for all destinations which have that initial portion of the network address in common. At each stage of a trie search there may be yielded an associated data block in this manner. It is continued to provide a first memory block 'on-chip' and the other blocks in external memory.

In the present example, the first segment (bits 31:21 of the destination address) of the key 51 accesses block 52 of pointers and the particular segment of the key identifies a particular pointer 53 within that block. In the present example this is a trie type pointer, which points to a further block 54. A particular pointer 55 within block 54 is determined using the next segment of the key. That pointer identifies a block 56 and the particular pointer 57 within that block is located using the next segment of the key. The process continues with further segments of the key until an AD block 58 is located. If the third stage had identified the AD type pointer in block 56, the result would be the AD block 59.

Figure 6:
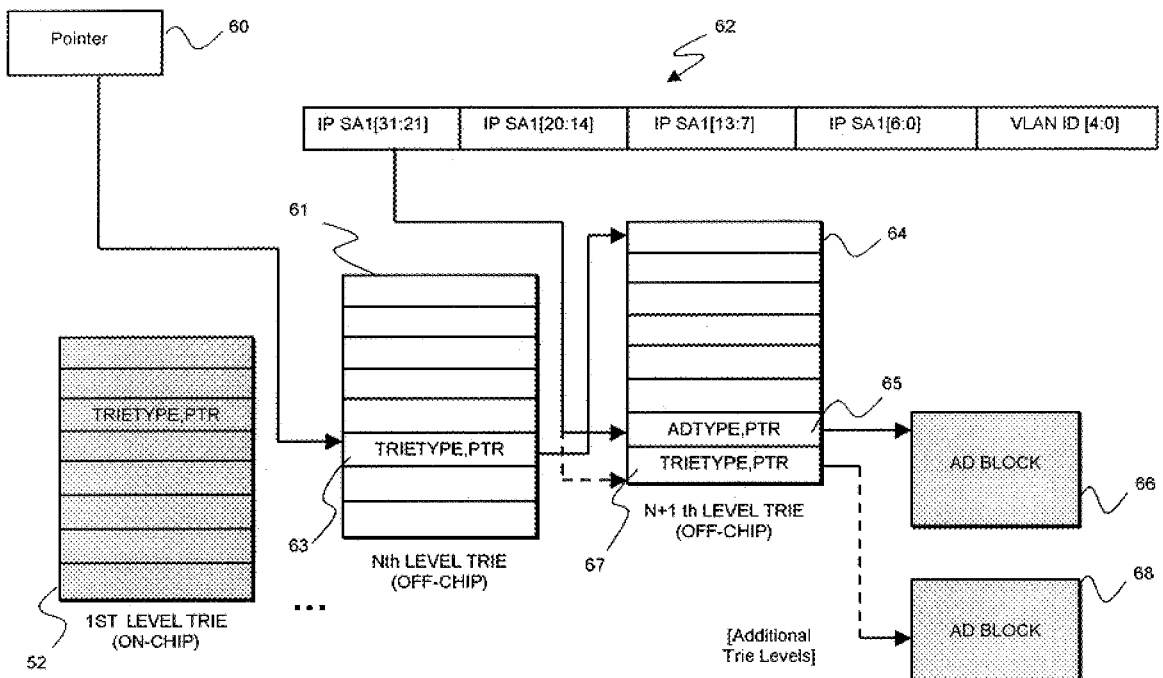
FIG. 6 illustrates s trie search performed in accordance with an exemplary embodiment of the invention.

FIG. 6 illustrates a trie search in accordance with the invention, wherein the source address and, in this example, the VLAN ID, have been accessed to provide the trie search key. The initial location has been determined by a pointer 60 which was latched on matching the IP DA with one of the registers. The first level trie block 52 and subsequent levels, which would as described in relation to FIG. 5 be accessed by segments of the destination address, have been (except block 54) bypassed.

Pointer 63 in block 61 is a trie type pointer pointing to the next level trie block 64. In this example the bits [31:21] of the key identify a result (AD type) pointer 65 which points to the required associated data (AD) block 66 containing the forwarding information. If (as shown by dashed lines) the first segment of the key 62 identified a trie type pointer 67 in block 64, the trie search process would continue using successive segments of the key until an AD block 68 were found.

What is claimed is:

1. A network switch including:

a multiplicity of ports for the reception and forwarding of addressed data packets including network destination data and network source address data; and a forwarding database having a trie search facility organized in blocks of pointers, said trie search facility accessing said blocks in response to respective segments of a search key, each of said pointers identifying in a last stage of a search forwarding data identifying each port from which a packet should be forwarded and identifying in any stage of the search prior to said last stage a block of pointers;

the switch including means operable before the trie search facility is utilized for a given packet to compare a network destination address of said given packet with at least one stored address and when said network destination address matches said stored address to access the network source address data of said given packet for use as the search key.

2. A network switch according to claim 1 wherein some of said blocks are accessible by different segments of said network destination data and wherein said search key when said network destination address matches said stored address bypasses blocks which are accessible by said different segments of said network destination data.

3. A network switch which includes:

a multiplicity of ports for the reception and forwarding of addressed data packets each including a destination address and a source address;

a forwarding database which is organised in blocks comprising blocks of pointers and blocks of associated data, wherein said pointers identify respective blocks and the blocks of associated data provide forwarding data for packets;

and a searching means which in response to successive segments of a key accesses corresponding pointers until a pointer identifies a block of associated data;

wherein said database has blocks accessible by different segments of the destination address and blocks accessible by different segments of the source address;

and wherein said searching means is operative to compare the destination address of a packet with a set composed of at least one stored address and when said destination addresses matches said one stored address to employ a relatively short key including segments of the source address and not including segments of said destination address.

4. A network switch according to claim 3 wherein said source and destination addresses are network addresses.

5. A network switch according to claim 4 wherein said set includes a virtual network address of a group of servers.

6. A network switch according to claim 4 wherein said set includes network destination addresses of multicast traffic.

* * * * *